3,484,334
DECORATIVE LAMINATED ARTICLE AND PREPARATION THEREOF
Toshio Wakayoshi, Takarazuka-shi, Masasuke Ohtani, Toyonaka-shi, Masao Takahashi, Neyagawa-shi, Tadao Ashikaga, Wurashiki-shi, Unpei Meada, Soja-shi, and Mamoru Sato, Nishinomiya-shi, Japan, assignors to Sumitomo Chemical Company, Ltd., Osaka, Japan, and Kurashiki Rayon Co., Ltd., Sakazu, Kurashiki-shi, Japan, both corporations of Japan
No Drawing. Filed Oct. 18, 1965, Ser. No. 497,449
Claims priority, application Japan, Nov. 30, 1964, 39/67,548
Int. Cl. B32b 29/06
U.S. Cl. 161—151                                   7 Claims

ABSTRACT OF THE DISCLOSURE

A decorative laminated article of a base material and an overlay paper impregnated with a diallyl phthalate resin, the overlay paper being made of a water-soluble polyvinyl alcohol or of a mixture of more than 1% of said water-soluble polyvinyl alcohol and less than 99% of a water-insoluble polyvinyl alcohol fiber having a homogeneous sectional structure. The laminated article may be prepared by laminating the impregnated paper directly onto the base material with heat and pressure or a printed paper or a combination of a printed cotton cloth with a shielding paper, either impregnated with a diallyl phthalate resin, may be placed between the base material and the impregnated overlay paper.

---

This invention relates to a decorative laminated article comprising a thermosetting resin, particularly a diallyl phthalate polymer. More particularly, this invention relates to a decorative laminated article having good appearance, which is obtained by laminating an overlay paper made of polyvinyl alcohol fiber impregnated with diallyl phthalate resin, if necessary, together with a printed paper impregnated with said resin or a printed cotton cloth and a shielding paper impregnated with said resin, on a base material such as plywood by means of heating and pressing.

Decorative laminated articles must have various characteristics on the decorated surfaces depending on their method of application. For instance, when applied on vertical surfaces such as interior materials of buildings, properties such as weathering resistance, impact resistance and staining resistance are required for the article in addition to beautiful appearance which is most important. While, when applied on horizontal surfaces such as table and counter overlays, further superior properties such as heat resistance, hot-water resistance and abrasion resistance, are required for the article.

Hitherto, decorative laminated articles have been prepared by laminating a printed paper impregnated with diallyl phthalate polymer on a suitable base material by means of heating and pressing. However, the article is not convenient for applications to the usual horizontal surfaces, because the article thus obtained has no protective resin layer sufficient to provide the required properties. Even if the printed paper is impregnated with a large amount of resin in an attempt to produce a resin layer of high thickness sufficient to provide the properties required for horizontal surfaces, a major amount of resin escapes from the surface into the base material or to outside of the laminated article at the time of heating and pressing and cannot contribute to the formation of the resin layer.

In order to remove the above disadvantages, papers made of cellulose fiber have been proposed as overlay paper. In this case, however, small holes tend to be produced on the surface in the laminated article and the pattern of the printed paper becomes unclear.

Further, there have been proposed papers made of synthetic high molecular substances such as polyamide and polyester, in place of the above mentioned cellulose fiber, as overlay paper. However, these papers must contain a bonding agent, which discolors the papers to yellow when heated and pressed. The overlay paper made of polyamide is greatly discolored to yellow itself when subjected to heating and pressing so that clear-cut color cannot be obtained. The overlay paper made of polyester is poor in transparency and the pattern of the printed paper appears unclear. Further, paper made of polyacrylonitrile has been proposed and which can give good transparency, but the overlay paper impregnated with diallyl phthalate resin is discolored to yellow more or less when kept for a long period and it is unsuitable for clear colors.

It is an object of the present invention to provide decorative laminated articles excellent in both appearance and properties, with no opacity, no discoloring to yellow and free of visible fibers in the surface of the laminated article.

Other objects and advantages of the present invention will be apparent from the following descriptions.

The present invention provides decorative laminated articles comprising an overlay paper a paper made of polyvinyl alcohol fiber and as an impregnated resin diallyl phthalate polymer.

Particularly, the present invention provides decorative laminated articles comprising as overlay paper a paper made of soluble polyvinyl alcohol fiber obtained by spinning a solution containing polyvinyl alcohol or its derivatives; or a mixture of said soluble polyvinyl alcohol fiber and other polyvinyl alcohol fiber having homogeneous sectional structure. The polyvinyl alcohol paper contains no bonding agent.

The soluble polyvinyl alcohol (hereinafter referred to as PVA) fiber to be used in the present invention is prepared as follows. Polyvinyl alcohol having a polymerization degree 1,400–2,000 and a saponification degree of 95–100% is dissolved in hot water at 90°–100° C. to make a 10–20% aqueous solution. Using this solution as a spinning solution, wet spinning is conducted in a spinning bath containing Glauber's salt as the main component. After wet heat stretching to 2–5 times, the filaments are dried with a temperature gradient of 100°–150° C. until the water content of the filaments becomes 1–5%.

The soluble PVA fibers in the present invention have a water dissolving point of 40°–95° C., preferably 70°–90° C. Soluble PVA fiber, the water dissolving point of which is lower than 40° C., possesses poor compatibility with the diallyl phthalate polymer and monomer, and that higher than 95° C., possesses bad transparency. Generally, the lower the water dissolving point of the soluble PVA fiber, the better the transparency of the resulting laminated product. On the contrary, the higher the water dissolving point of the soluble PVA fiber, the better the hot-water resistance of the resulting laminated product. Taking the two conditions into consideration, especially soluble PVA fiber which possesses a water dissolving point of 70°–90° C. is especially preferable.

The PVA fiber having a homogeneous sectional structure in the present invention is a fiber whose sectional structure is homogeneous, though the ordinary fibers of this kind possess heterogeneous sectional structures which are horse-shoe-shaped and consist of a transparent skin layer and a spongy core layer. The PVA fiber having homogeneous sectional structure can be prepared, for instance, by dry-spinning of PVA, by wet spinning of a mixture of PVA and starch, by the coagulation method using a concentrated aqueous solution of caustic soda as the coagulation bath in cases of wet type preparation of PVA fibers, or by spinning using the conventional Glauber's salt bath and then water-rinsing and drying under tension to make homogeneous fiber.

When the soluble PVA fibers alone are made into paper, the resulting paper satisfies the properties required as overlay paper. In this case, if other ordinary PVA fiber or other kind of fiber is contained, even in a small amount, the transparency of the surface of the resulting decorative surface is greatly lowered. But PVA fibers having homogeneous sectional structure are an exception and can be contained with the soluble PVA fibers without losing the desired properties as overlay paper. In this case, as the mix proportion of the PVA fibers having homogeneous sectional structure to the soluble PVA fibers is increased, the dimensional change during paper making can be decreased. But if the mixing proportion of the PVA fibers having homogeneous sectional structure is too high, the binding property is poor, so that formation of paper becomes difficult. Accordingly, the PVA fibers having homogeneous sectional structure must be in a proportion of at maximum 99% by weight in the mixture, preferably lower than 95%.

Papers which can be used as overlay paper have a thickness of 0.03–0.30 mm. and a weight of 10–50 g./m.² For uniform resin impregnation, it is preferable that the apparent density of the overlay paper be not higher than 0.3 g./cm.³ If the apparent density of overlay paper is higher than 0.3 g./cm.³ the impregnation of resin in an amount sufficient to satisfy properties required for applications to horizontal surfaces result in resin not being contained in the voids among fibers of overlay paper and excess resin attaches on the surface unequally. In the parts where much resin attaches unequally, upon heating and pressing, greater flowing of resin as compared with the other parts occurs. The flowing power is great. When the flowing power is greater than the strength of overlay paper, the part is cut down and a completely uniform resin layer can not be formed.

Though it is possible to impregnate the PVA overlay paper with other thermosetting resins such as melamine resin, polyester resin, phenol resin and so on; the impregnation with diallyl phthalate polymer gives much better results.

Resin solutions to be impregnated into the overlay paper can be prepared as follows. A thermoplastic polymer of diallyl or dimethallyl ester of orthophthalic acid, isophthalic acid or telephthalic acid is dissolved in a relatively volatile solvent, for example, ketone such as acetone, methyl ethyl ketone or methyl isobutyl ketone; aromatic solvent such as benzene, toluene or xylene; ester solvent such as ethyl acetate or butyl acetate. Further, diallyl phthalate monomer in an amount of not higher than about 30% by weight based on the polymer is added as a component to impart fluidity upon the resin and as a component for a cross-linking agent. Furthermore, in order to accelerate resin curing, an organic peroxide is added as catalyst usually in an amount of 1–5 weight percent based on the resin. The catalysts which may be used include tert.-butyl perbenzoate, benzoyl peroxide, tert.-butyl hydroperoxide and other organic peroxides which are effective at the curing temperature but are not substantially decomposed or hardly decomposed during the drying step after impregnation. In addition, in order to make the laminated article release early after lamination, it is desirable to add an internal releasing agent such as lauric acid, caranauba wax, or beeswax, in an effective amount, usually about 2–5 weight percent based on the total weight of diallyl phthalate polymer and monomer. The concentration of resin solution thus prepared is in the range of about 25–70% solids and especially the range of about 35–50% solids is preferable.

The PVA overlay paper is impregnated by means of ordinary apparatus and methods. Particularly the paper is passed through a tank containing resin solution for impregnation. The amount of the resin absorbed can be adjusted for instance, by controlling the speed of passing paper or by changing the type of solvent system to be used or solid percent in the impregnating resin solution or by using a metering roll, doctor blade or transferring roll. The impregnation is conveniently conducted at room temperature and subsequently the solvent is evaporated at an elevated temperature by hot air in a tunnel dryer arranged horizontally or vertically. It is desirable that the impregnated amount of resin be adjusted to about 30–90 weight percent based on the dried impregnated overlay paper. If the impregnated amount of resin is lower than 30%, a hard resin layer can not be formed. If the impregnated amount of resin is higher than 90%, excess resin escapes to the outside of the laminated article during lamination and part of resin can not contribute to the formation of the resin layer. Drying the impregnated overlay paper is conducted usually at 70°–120° C. It is desirable that the drying be such that a minimum of residual solvent and other volatiles be given off during the curing step. If drying is too severe, curing of the resin proceeds and causes inferior articles.

The printed paper is chosen from the papers usually used for polyester resin decorative articles and melamine resin decorative articles and the like, for example, papers having a thickness of 0.08–0.12 mm. and weight of about 80 g./m.² and papers having a thickness of 0.20–0.30 mm. and a weight of 150 g./m.² Impregnation of the printed paper with the resin is conducted in a similar way to that above mentioned. It is desirable that the resin content in the printed paper be 30–70 weight percent based on the printed paper impregnated and dried. If the resin content is lower than 30 weight percent, strong bonding of the paper with the base material can not be obtained. If the resin content is higher than 70 weight percent, a part of the resin can not contribute to the formation of the resin layer and this is not economical.

In place of impregnated printed paper, a combination of a printed cotton cloth and an impregnated shielding paper may be employed.

As to the base material, almost all base materials of high, medium and low density can be used. The typical base materials are plywood hard-board, particle-board and cement-asbestos board. These boards should have parallel surfaces and uniform compressibility. If necessary, the surface to be laminated should be filled. In some cases when the base material contains water and other volatile contents expected to volatilize in the course of lamination, pre-drying should be conducted under appropriate conditions. In order to prevent warp of the laminated article after lamination, the base material should be balanced between the top surface and the back surface, and the back surface is protected with kraft papers impregnated with inexpensive resin such as phenol resin or melamine resin.

The lamination can be carried out using a standard platen press. Particularly, the impregnated overlay paper singly or together with a printed paper or a printed cotton cloth and an impregnated shielding paper is placed on a base material. If necessary, one to several sheets of kraft paper impregnated with phenol resin are placed on the back surface of the base material. On the top of the combination is placed a desirably finished aluminum or stainless steel caul plate and also on the back surface, is placed a suitable caul plate. The assembly is treated in a lamination press under the conditions of temperature, time and pressure sufficient to cure the impregnating diallyl phthalate resin. The laminating pressure should be sufficient to make the resin flow and to form a continuous resin layer and should be such a high pressure that some of resin is forced into the base material for the purpose of adhesion. The required pressure depends on factors of density and surface condition of the base material, flow characteristics of the resin in the impregnated paper and so on. Usually, a laminating pressure of 5–30 kg./cm.² gives sufficient flow of resin, and desired luster surface and strong bonding with the base material can be obtained. The curing temperature should be enough to activate the catalyst and to cure the resin at a suitable curing rate. Higher temperature is desirable from the view point that the shorter the curing time, the greater the production efficiency, but the curing temperature is limited from the view point of stability of the base material and heat resistance of the paper fiber. Usually a temperature of 100°–170° C. is adopted.

The following examples merely illustrate the present invention but it is not intended to limit the same.

Example 1

Polyvinyl alcohol having a polymerization degree of 1700 and a saponification degree of 99 mol percent was dissolved in hot water to make a 15% aqueous solution. This spinning solutioin was spun in a spinning bath containing Glauber's salt as the principal component by means of wet spinning and the filament was stretched by 230% and dried at 100°–110° C. until a water content of 3%. The resultant PVA fiber was soluble in water at 75° C. The fiber was cut down into 4 mm. length and dispersed in water at the paper material concentration of 0.2 weight percent by means of a high speed separator. Then paper was formed by a paper machine and, after squeezing water, was dried by a drier having a surface temperature of 90° C. to obtain a paper of 30 g./m.$^2$ weight and 0.2 mm. thickness. This paper was impregnated as an overlay paper with a resin solution having the following composition. For the impregnation, an ordinary dipping apparatus was employed.

| | Parts by wt. |
|---|---|
| Diallyl phthalate polymer | 93 |
| Diallyl phthalate monomer | 7 |
| Lauric acid | 3 |
| Tert.-butyl perbenzoate | 3 |
| Acetone | 175 |

The resin content was adjusted by a doctor blade. After impregnation, the overlay paper was dried by passing through a horizontal tunnel, in which hot air at 100° C. was circulated, for 5 minutes. In the dried overlay paper about 120 g. of resin were impregnated per one square meter of paper. Therefore, the resin content was 80% (weight percent of resin in the impregnated paper).

On the other hand, in a manner similar to the above, a printed paper having 0.10 mm. thickness and 80 g./m.$^2$ weight was impregnated with the above resin bath and dried to obtain a resin content of 65% by weight, based on the impregnated printed paper, of impregnated printed paper.

When the overlay paper and the printed paper were dried by heating at 150° C. for 8 minutes, the reductions of weight due to volatile contents were 4.2% and 5.1% respectively.

Then, on a stainless steel luster finished caul plate, were piled the overlay paper, the printed paper, a hardboard of 3.5 mm. thickness which has been pre-dried in a hot air furnace at 160° C. for 10 minutes and three sheets of kraft paper impregnated with phenol resin. On the top, another stainless steel plate was put. The construction was placed in a laminating press and laminated at 160° C. under 15 kg./cm.$^2$ pressure for 15 minues. The resultant laminated article had good surface luster and good transparency without any defects and neither coloration nor fiber show was observed. Results of NEMA standard tests on the laminated article are shown in the following Table I.

Table I

Test item: Test result
Heat resistance _____ Pass (no change).
Boiling water resistance __ Pass (no change).
Abrasion resistance _____ 420 cycles, weight loss 70 mg./100 cycles.
Cigarette resistance _____ Pass (121 seconds).
Stain resistance _____ Pass (no change).
Light resistance _____ Pass (no change).

Example 2

In order to compare various basic materials for overlay paper to be impregnated with diallyl phthalate polymer, non,woven fabrics having 30 g./m.$^2$ weight and 0.10–0.20 mm. thickness, which had been made of fibers shown in Table II, were impregnated with the same resin solution as in Example 1 according to the ordinary method, and then dried at 100° C. for 10 minutes to obtain resin content of 80% respectively.

TABLE II

| No. | Fiber | Fineness | Length (mm.) |
|---|---|---|---|
| 1 | Rayon | 1.5 denier | 3 |
| 2 | Glass fiber | 1.3 micron | 5 |
| 3 | Nylon [1] (Polyamide) | 1.0 denier | 3 |
| 4 | Rayon | 12 denier | 3 |
| 5 | do | 25 denier | 3 |
| 6 | Tetron [1] (polyethylene terephthalate) | 1.5 denier | 3 |
| 7 | Vinylon [2] (polyvinyl alcohol) for cloth | 1.4 denier | 4 |

[1] Toyo Rayon.
[2] Kurashiki Rayon.

These overlay papers together with printed papers impregnated and dried in a similar manner to that described above and having a resin content of 65% were laminated on hard-boards of 3.5 mm. thickness as in Example 1. The appearances of these were as shown in Table III.

TABLE III

| No. | Transparency | Coloration | Fiber show |
|---|---|---|---|
| 1 | Good | None | Observed. |
| 2 | do | do | Do. |
| 3 | Bad | Observed | None. |
| 4 | do | None | Observed. |
| 5 | do | do | Do. |
| 6 | do | do | None. |
| 7 | do | do | Do. |

Example 3

100 parts (by weight) of fully hydrolized polyvinyl alcohol and 20 parts (by weight) of starch were spun and subjected to heat treatment and acetalization treatment in the manner used as in the preparation of ordinary PVA fiber, and then dried and cut down into 3 mm. length. 80 parts (by weight) of the thus obtained fiber and 20 parts (by weight) of soluble PVA fiber obtained as in Example 1 were made into paper by an ordinary cylinder paper machine. The resultant PVA paper of 0.15 mm. thickness and average weight of 30 g./m.$^2$ was impregnated with the following resin solution.

| | Parts by wt. |
|---|---|
| Diallyl phthalate polymer | 85 |
| Diallyl phthalate monomer | 15 |
| Lauric acid | 3 |
| Benzoyl peroxide | 2 |
| Acetone | 150 |

The impregnation was conducted by passing the paper through said resin solution at a speed of 5 m./minute according to ordinary methods. The drying was conducted by passing the impregnated paper through a tunnel in which hot air at 70° C. was circulated. The time of passing through the hot air tunnel was 3 minutes.

The resultant impregnated overlay paper had a resin content of 80%, and a volatile content of 4.3% determined by drying at 120° C. for 8 minutes. The impregnated overlay paper was placed on a fancy wood veneer decorated ply-wood of 4 mm. thickness, and thereon a luster finished aluminum caul plate was placed so as to contact its luster finished surface with said overlay paper. The construction was put in a laminating press and cured by heating at 120° C. under pressure of 7 kg./cm.$^2$ for 10 minutes. The thus obtained laminated product had excellent luster and clear-cut wood grain.

Example 4

Polyvinyl alcohol was spun using as the coagulation bath a caustic soda aqueous solution having a concentration of 280 g./l. The obtained PVA fiber was cut down into 4 mm. length. 50 parts (by weight) of the resultant fiber and 50 parts (by weight) of the soluble polyvinyl alcohol fiber described in Example 1 and cut down into 3 mm. length were mixed and made into paper. The thus obtained paper of fiber 1.5 deniers thickness, 0.12 mm. thickness and 30 g./m.$^2$ weight was passed through the following resin solution at a speed of 3 m./minute to be impregnated.

| | Parts (by wt.) |
|---|---|
| Diallyl phthalate polymer | 93 |
| Diallyl phthalate monomer | 7 |
| Lauric acid | 3 |
| Tert.-butyl perbenzoate | 3 |
| Methyl ethyl ketone | 160 |
| Toluene | 40 |

Drying of the impregnated paper was conducted by passing the impregnated paper through a hot air circulating furnace at 100° C. for 10 minutes to obtain an impregnated overlay paper of 80% resin content. Volatile content of the impregnated overlay paper, determined by drying at 160° C. for 8 minutes, was 3.8%.

On the other hand, α-cellulose paper of thickness 0.12 mm. and weight 82 g./m.$^2$ and containing white pigment was impregnated and dried in similar way to the overlay paper drying to obtain a shielding paper of 65% resin content and 4.6% volatile content.

A printed cotton cloth was inserted between the overlay paper and the shielding paper. The combination was put on a hard-board of 3.5 mm. thickness, which had been predried in a hot air furnace at 160° C. for 10 minutes, and laminated as in Example 1. The resultant laminated product a highly luster finished surface and the printed pattern presented an unusual appearance.

What we claim is:
1. A decorative laminated article consisting essentially of a base material and an overlay paper impregnated with a diallyl phthalate resin, in which the overlay paper is made of water-soluble polyvinyl alcohol fiber or of a mixture thereof with a water-insoluble polyvinyl alcohol fiber having a homogeneous sectional structure.

2. The decorative laminated article according to claim 1, wherein said soluble polyvinyl alcohol fiber has a water dissolving point of 70°–90° C.

3. The decorative laminated article according to claim 1, wherein the proportion of polyvinyl alcohol fiber having homogeneous sectional structure in said mixture is lower than 99% by weight.

4. A decorative laminated article according to claim 1, wherein the article further comprises an intermediate layer material chose from the group consisting of a printed paper and a combination of a printed cotton cloth with a shielding paper, the material being impregnated with a diallyl phthalate resin and lying between the base material and the impregnated overlay paper.

5. A process for producing a decorative laminated article consisting essentially of a base material and an overlay paper impregnated with a diallyl phthalate resin, characterized in that the overlay paper is made of a water-soluble polyvinyl alcohol fiber or a mixture thereof with a water-insoluble polyvinyl alcohol fiber having a homogeneous sectional structure said water-insoluble fiber constituting less than 99% by weight of said mixture which comprises laminating said overlay paper on said base material, the overlay paper being impregnated with a diallyl phthalate polymer and monomer solution.

6. A process according to claim 5, wherein said soluble polyvinyl alcohol fiber has a water dissolving point of 70°–90° C.

7. A process for producing a decorative laminated article according to claim 5, wherein the lamination is effected in the presence of an intermediate layer material between the impregnated overlay paper and the base material, said intermediate layer material being chosen from the group consisting of a printed paper and a combination of a printed cotton cloth with a shielding paper and being impregnated with a diallyl phthalate resin.

References Cited

UNITED STATES PATENTS

| | | | |
|---|---|---|---|
| 2,962,762 | 12/1960 | Hartmann et al. | 162—157 |
| 3,108,030 | 10/1963 | Taylor | 161—232 X |
| 3,114,670 | 12/1963 | Iwasaki | 162—146 |
| 3,208,901 | 9/1965 | Kelley et al. | 161—151 |

HAROLD ANSHER, Primary Examiner

R. A. KILLWORTH, Assistant Examiner

U.S. Cl. X.R.

117—138.8, 161; 156—332; 161—231, 409, 413